United States Patent [19]

Perry et al.

[11] Patent Number: 5,492,448
[45] Date of Patent: Feb. 20, 1996

[54] ROTARY BLADES

[75] Inventors: Frederick J. Perry, Yeovil; Alan Brocklehurst, Bradford Abbas, both of England

[73] Assignee: Westland Helicopters Limited, Yeovil, England

[21] Appl. No.: 207,053

[22] Filed: Mar. 8, 1994

[30] Foreign Application Priority Data

Mar. 13, 1993 [GB] United Kingdom ............ 9305187
Nov. 25, 1993 [GB] United Kingdom ............ 9324298

[51] Int. Cl.[6] ............................................. B64C 27/467
[52] U.S. Cl. .................... 416/62; 416/228; 416/236 R; 416/243
[58] Field of Search ........................... 416/62, 228, 235, 416/236 R, 237, 243; 244/198

[56] References Cited

U.S. PATENT DOCUMENTS

| | | |
|---|---|---|
| 1,893,064 | 1/1933 | Zaparka. |
| 2,385,070 | 9/1945 | Gant ............................. 416/237 R |
| 2,396,811 | 3/1946 | Bathras ............................. 416/235 |
| 3,697,193 | 10/1972 | Phillips ............................. 416/243 |
| 3,776,363 | 12/1973 | Kuethe ............................. 416/228 |
| 4,542,868 | 9/1985 | Boyd. |
| 4,552,511 | 11/1985 | Sumigawa ............................. 416/237 |
| 4,618,313 | 10/1986 | Mosiewicz ............................. 416/62 |
| 4,858,852 | 8/1989 | Henne et al.. |
| 5,088,665 | 2/1992 | Vijgen et al.. |

FOREIGN PATENT DOCUMENTS

| | | | |
|---|---|---|---|
| 1455054 | 1/1989 | U.S.S.R. ............................. 416/243 |
| 496700 | 12/1938 | United Kingdom ............................. 416/62 |
| 2059373 | 4/1981 | United Kingdom. |
| 2101693 | 1/1983 | United Kingdom ............................. 416/236 R |
| 88/09745 | 12/1988 | WIPO. |

*Primary Examiner*—F. Daniel Lopez
*Assistant Examiner*—James A. Larson
*Attorney, Agent, or Firm*—Larson & Taylor

[57] ABSTRACT

A rotary blade includes a fixed boundary layer control device extending spanwise on a lower surface adjacent the trailing edge to improve the lift/thrust characteristics of the blade especially at positive incidence angles. It was discovered that expected detrimental effects at zero/negative incidence did not materialize and the reasons are identified. Such blades are particularly useful for helicopter sustaining and anti-torque rotors.

15 Claims, 8 Drawing Sheets

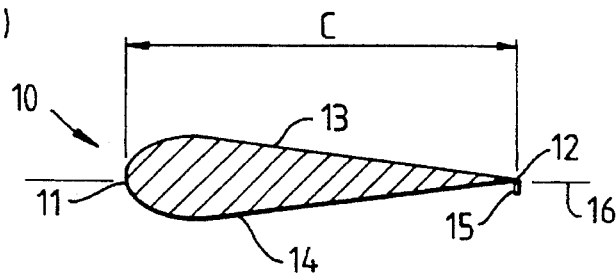
Fig.1. (PRIOR ART)
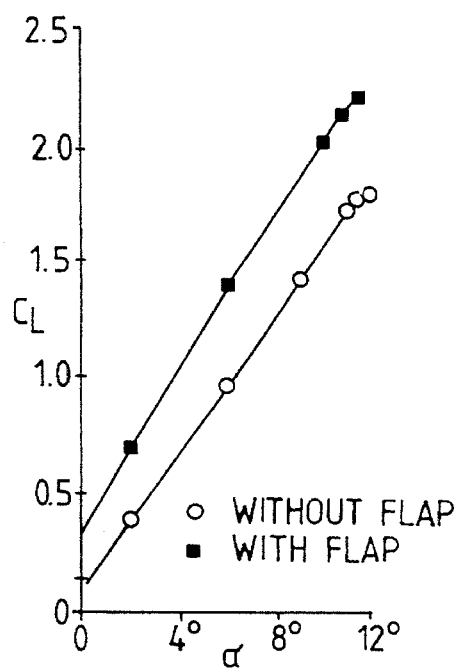
Fig.2A-1 (PRIOR ART)
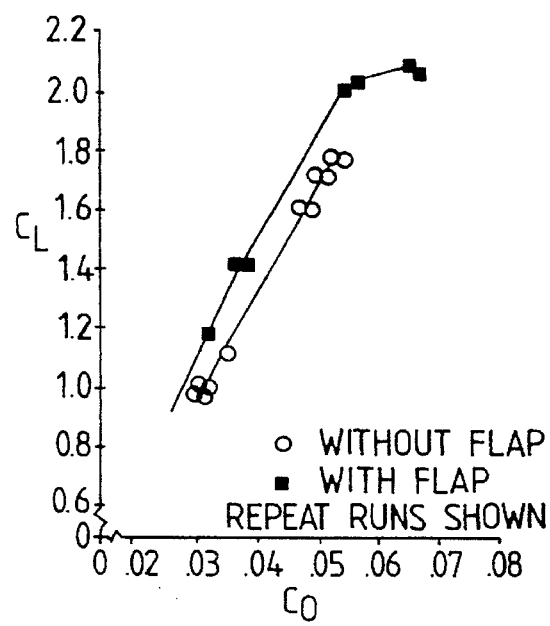
(PRIOR ART) Fig.2A-2
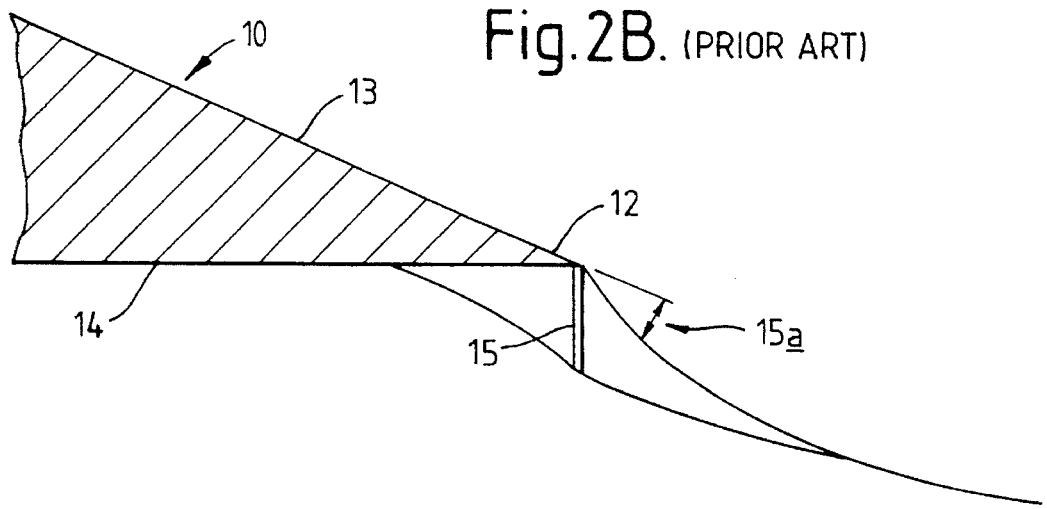
Fig.2B. (PRIOR ART)

ROTARY BLADES

BACKGROUND OF THE INVENTION

1. Field of the Invention

This invention relates to rotary blades and is particularly concerned with blades which are rotated by a power source to generate lift and/or propulsion.

In the following text, many references are made to upper and lower surfaces of an aerofoil profile of a rotary blade. For the purpose of defining these terms the aerofoil profile is considered to be that of a wing generating lift when at positive incidence. In flowing over the upper surface air decreases in pressure and the upper surface is thus also referred to as the suction surface, and in flowing over the lower surface air increases in pressure and the lower surface is thus also referred to as the pressure surface.

One application of powered rotary blades is in helicopters where such blades are used both in main sustaining rotors which rotate in a generally horizontal plane about a vertical axis and in anti-torque tail rotors which rotate in a generally vertical plane about a horizontal axis.

The flight envelope of any helicopter is bounded according to the fundamental aerodynamic limits of the aerofoil profiles used in its rotary blades.

In the case of a sustaining rotor it is necessary to balance the lift (or thrust) produced by its rotary blades in the advancing and retreating sectors of its operational rotor disc. This dictates that a rotary blade must perform well both at low Mach number and high angle of attack (incidence) as the retreating blade, and at high Mach number and low or negative incidence as the advancing blade. The same aerofoil profile must therefore have both a high stalling angle (for the retreating blade) and a high limiting Mach number; for a rotary blade without advanced tip planform geometry such as disclosed in GB-A-1538055 which can to some extent uncouple the problem, its performance is determined by its aerofoil profile.

For rotary blades with such advanced tip planforms which allow some penetration of the aerofoil profile separation boundary on the retreating blade, the aerofoil profile remains close to separation and drag rise around the rear of the rotor disc. Because dynamic head is high in this region, drag-rise and stall cannot be tolerated so that the aerofoil profiles of such blades must also possess high performance at mid Mach number.

In the case of rotary blades for an anti-torque tail rotor, the extreme high and low Mach number performance requirements are more relaxed although high performance at mid Mach number is of paramount importance, requiring a different aerofoil profile aerodynamic solution.

In striving to extend the flight envelope of helicopters it is essential to increase the performance of both the sustaining rotor and the anti-torque tail rotor, and improvements (or trade-offs) involving all three operating regimes (low, mid and high Mach number regimes) are required. Designers are finding it increasingly difficult to achieve this requirement using conventional aerofoil profile design techniques.

2. Description of the Prior Art

An in-depth review by the inventors of known design techniques revealed a device which has become known as a Gurney flap. The device was developed for use on the fixed aerofoil surfaces of racing cars and design features and performance characteristics were published in Journal of Aircraft, Volume 15 No. 9 September 1978 AIAA "Design of Subsonic Aerofoils for High Lift, Robert H. Liebeck, pages 547–561.

Briefly, a Gurney flap is a fixed airflow deflection device protruding from a lower surface of an aerofoil profile along its extreme trailing edge, and was shown by Liebeck to offer, at positive angles of incidence which was the only area of concern for that application, an increase in the maximum lift coefficient ($C_{LMAX}$) and a reduction in drag.

For these reasons, such devices have been used on fixed aerofoil tail surfaces of helicopters, both on horizontal surfaces to increase their effectiveness or reduce the required size, and on vertical surfaces to reduce the required thrust from the tail rotor at high forward speed. Such a device has not hitherto been considered for use on rotary blades because it was believed that it would produce an unacceptable increase in a blade pitching moment combined with an increase in drag in the high Mach number low/negative incidence regime encountered for example by the advancing blade on a helicopter sustaining rotor.

However, a detailed investigation by the inventors into hitherto unexplored features and operational regimes of Gurney flap type airflow deflection devices has revealed an unexpected potential for actually improving the performance of rotary blades with little or no adverse effect.

A main objective of this invention therefore is to improve the performance of rotary blades to achieve an extended operating envelope.

A further objective is to achieve the main objective by improving the thrust characteristics of a rotary blade operating at high incidence and low Mach number and with little or no adverse effect upon performance when operating at low or negative incidence and high Mach number, whilst also improving the aerofoil performance at mid Mach number.

A yet further objective is to achieve the aforementioned objectives using a flow deflection device at the trailing edge of a rotary blade which has the effect of increasing the camber locally at the blade trailing edge and by a variable amount depending on flow conditions.

SUMMARY OF THE INVENTION

Accordingly in one aspect this invention provides a rotary blade having a span dimension defined by a root end and a tip end and a chord dimension defined by a leading edge and trailing edge, the blade being of aerofoil profile in chordwise cross section and having a fixed boundary layer flow deflection device extending spanwise on a lower surface of the aerofoil profile at or adjacent the trailing edge thereof.

The flow deflection device may extend over all or part of the span dimension of the rotary blade and may be formed integral with the lower surface or may be attached thereto.

The flow deflection device may comprise a fixed strip protruding from the lower surface at the trailing edge and generally perpendicular to a chord line of the aerofoil profile.

Alternatively, the flow deflection device may be provided by local cambering of the aerofoil profile at the lower surface in the region of the trailing edge of the blade.

The size of the flow deflection device may be of the order of 1 percent chord in height towards the blade tip and the size may vary along its length. Preferably the size of the flow deflection device is between 0.5 percent chord and 1 percent chord in height between about 70 percent and 100 percent of the blade span dimension.

A boundary layer flow thickening device may be provided on the lower surface upstream of the flow deflection device to increase the thickness of the boundary layer when the rotary blade is operating at low or negative incidence.

The boundary layer flow thickening device may comprise a local protrusion formed on the lower surface and may comprise a convex protrusion.

The flow thickening device may be located between approximately 80 percent chord and 90 percent chord.

A curved fillet may be provided upstream of the flow deflection device to blend the flow deflection device with the blade lower surface.

A rotary blade in accordance with the invention may be one of an assembly of such blades connected for rotation by a power source, for example a gas turbine engine, to generate lift and/or propulsive forces.

In one such assembly the blades are propeller blades connected for rotation about a substantially horizontal axis to generate propulsive forces for an aerial vehicle such as a fixed wing aircraft.

In another such assembly the rotary blades may be for a prop-rotor arranged to be tilted between a position in which they are rotated about a substantially horizontal axis to produce propulsive force and a position in which they are rotated about a substantially vertical axis to produce lift forces for a tilt rotor or tilt wing aircraft.

In yet another such assembly the blades may be helicopter rotary blades for rotation about a substantially vertical axis in a main sustaining rotor assembly.

In yet another such assembly the blades may be helicopter rotary blades for rotation about a substantially horizontal axis in an anti-torque tail rotor assembly.

In another aspect, this invention provides a helicopter rotary blade having a root end for attachment to a rotor hub and a tip end defining a blade span and in cross section being of aerofoil profile having a leading edge and a trailing edge defining a blade chord and joined by an upper surface and a lower surface, the blade in use being adapted for movement through a range of incidence angles with respect to an airflow, wherein the rotary blade includes a fixed boundary layer flow deflection device along the lower surface trailing edge and adapted, when the blade is operating at positive incidence angles, to deflect a boundary layer on the lower surface away from the trailing edge thereby improving the lift characteristics of the rotary blade.

BRIEF DESCRIPTION OF THE DRAWINGS

The invention will now be described by way of example only and with reference to the accompanying drawings in which, FIG. 1 is a cross section of a fixed aerofoil profile incorporating a prior art flow deflection device, FIG. 2A comprises graphs illustrating the operational characteristics of the device of FIG. 1, FIG. 2B is a fragmentary sectioned view of the device of FIG. 1 and illustrating hypothesized trailing edge flow conditions at positive incidence.

DETAILED DESCRIPTION OF THE DRAWINGS

Figure 3:
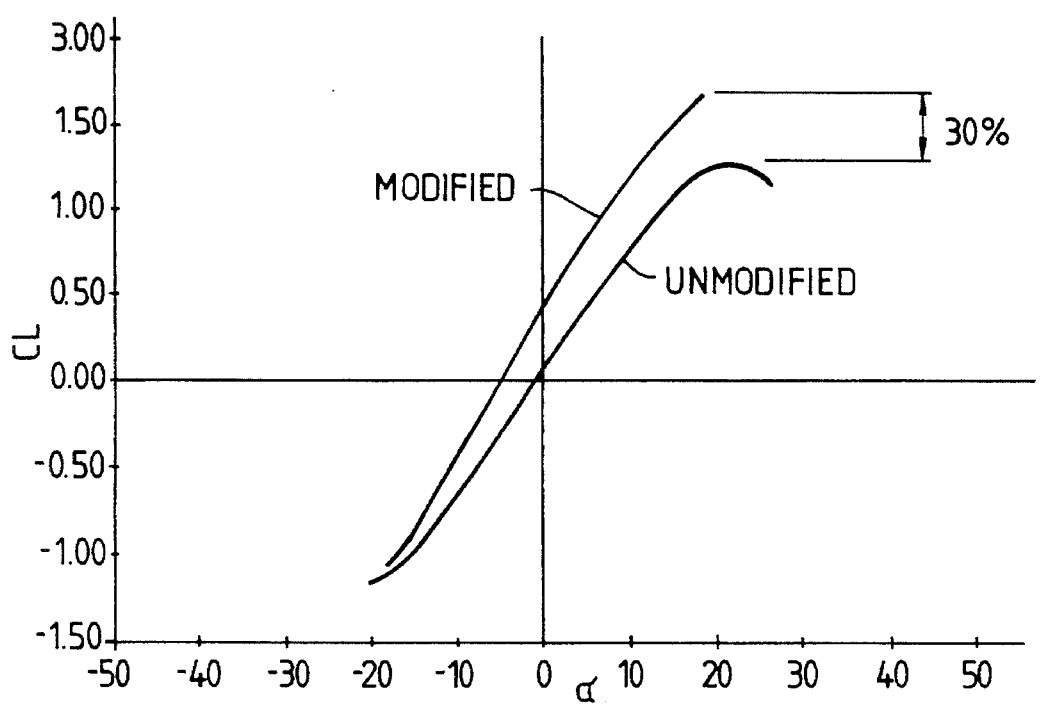
FIG. 3 is a graph illustrating the lift characteristics of a modified and unmodified aerofoil structure.

FIG. 1 is a cross section of a fixed, symmetrical aerofoil 10 tested by Liebeck in the aforementioned reference. The aerofoil 10 has a leading edge 11 and a trailing edge 12 defining a chord C and joined by an upper surface 13 and a lower surface 14.

The aerofoil 10 is fitted with a Gurney flap type flow deflection device comprising a fixed flap 15 protruding from the lower surface 14 along the trailing edge 12. The flap 15 had a uniform depth corresponding to 1.25% C. and was located generally perpendicular to a chord line 16.

FIG. 2A comprises graphs taken from Liebeck and illustrating the results of tests on the aerofoil profile 10 of FIG. 1. These show respectively that in the range of positive incidence angles tested ($\alpha$) there is a significant increase in lift ($C_L$) and a reduction in drag ($C_D$) in the modified aerofoil profile with the flap 15.

FIG. 2B, again from Liebeck shows hypothesized trailing edge flow conditions of the device of FIG. 1 at positive incidence and shows that the flow at the trailing edge 12 is partially turned towards the flap 15 as it leaves the trailing edge and as indicated at 15a.

In studying the work of Liebeck, the inventors realised that the incorporation of the flow deflection device 15 actually changed the overall lift curve at the positive incidence angles tested and noted that the lift curves tended to converge with reducing incidence ($\alpha$) as shown in FIG. 2A. This suggested to the inventors that the flow mechanism at the trailing edge 12 changed with incidence and they commissioned some tests on an aerofoil profile of a helicopter tailplane which was fitted with a relatively large flow deflection device 15 having a depth equivalent to about 2.5% C.

FIG. 3 illustrates graphically the results of the tests in respect of the lift ($C_L$) generated at a range of incidence ($\alpha$).

Thus, in verification of the tests of Liebeck, an increase of $C_{LMAX}$ of at least 30% at positive angles of incidence was indicated. However the inventors found that the effect of the flow deflection device on $C_{LMAX}$ at negative incidence is very small. This indicated to the inventors that for some reason the effect of the flow deflection device 15 diminished with decreasing incidence ($\alpha$), and they decided to investigate the boundary layer characteristics.

Figure 4A:
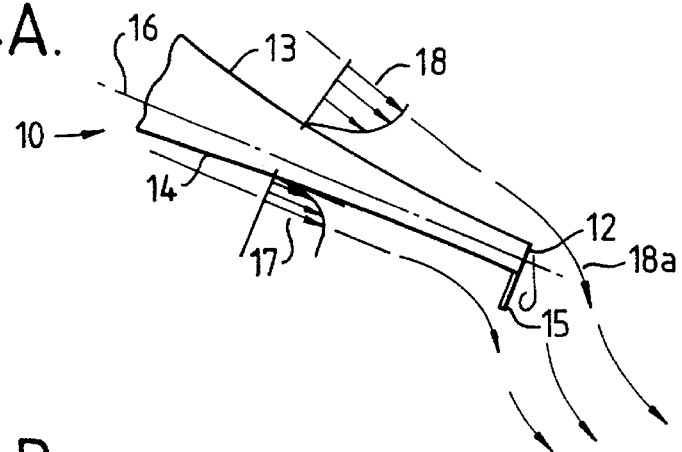
FIG. 4A illustrates boundary layer flow characteristics established by the inventors in respect of the structures tested in FIG. 3 at positive incidence and in conditions representative of those encountered by a retreating helicopter rotary blade.

Thus, as shown in FIG. 4A, at positive angles of incidence ($\alpha$) a boundary layer indicated by arrows 17 on the lower surface 14 of aerofoil 10 flows rearwardly from the stagnation point under the nose 11 directly to the trailing edge 12 in an accelerating flow field. The boundary layer 17 is therefore thin and energetic when it approaches the trailing edge 12 of the aerofoil 10 where the flow deflection device 15, which is of the same order of depth as the depth of the boundary layer 17, turns the boundary layer flow 17 through approximately 90 degrees and focuses a jet of air leaving the lower surface 14 at the trailing edge 12.

On the upper surface 13 of the aerofoil 10, a boundary layer 18 has to negotiate the nose 11 and the severe adverse pressure gradient as it flows towards the trailing edge 12. The boundary layer 18 is therefore thick and prone to separation but is then accelerated as indicated at 18a due to the deflection of the boundary layer flow 17 on the lower surface 14 produced by the flow deflection device 15.

The effect, which is similar to that which would be produced by incorporating high camber at the trailing edge 12, is to generate a large change of flow angle at the trailing edge 12 which sets the zero lift angle of the aerofoil profile 10 as well as the overall lift and moment characteristics.

Figure 4B:
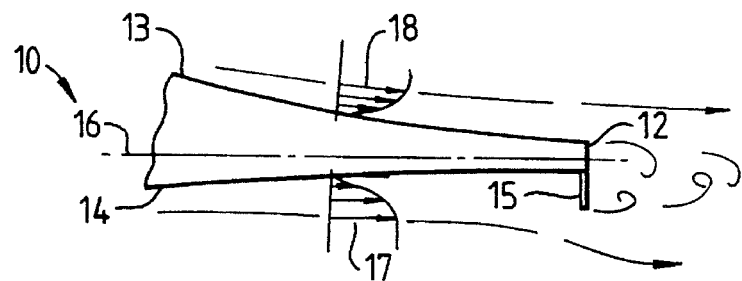
FIG. 4B illustrates boundary layer flow characteristics established by the inventors in respect of the structures tested in FIG. 3 at low or negative incidence and in conditions representative of those encountered by an advancing helicopter rotary blade.

However, the inventors found that when the aerofoil 10 is operating at negative incidence as shown in FIG. 4B, the boundary layer 17 on the lower surface 14 (now acting as the suction surface) remains thick and of low energy and the deflection effect of the deflection device 15 tends to be lost in the near-wall low energy region of the boundary layer 17 at the trailing edge 12.

The inventors were therefore able to explain why the lift enhancing effect at high incidence disappears from the aerofoil 10 when approaching maximum negative $C_{LMAX}$ at negative incidence as shown in FIG. 3, and it became clear that the effect of even this relatively large flow deflection device 15 tended to disappear when immersed in the thick boundary layer 17.

The aforementioned variation of the lift curve is clearly shown in FIG. 3 in which the lift curve slope of the modified aerofoil with the flow deflection device 15 is increased. This is a result of the zero lift angle varying due to the interaction between the deflection device 15 and the boundary layer 17 which depends on incidence. This contrasts with the behaviour of an aerofoil profile fitted with typical split flap devices of much larger proportions which affect both positive and negative stalling values of lift coefficient by the same amount, and the lift curve slopes remain the same.

Figure 5:
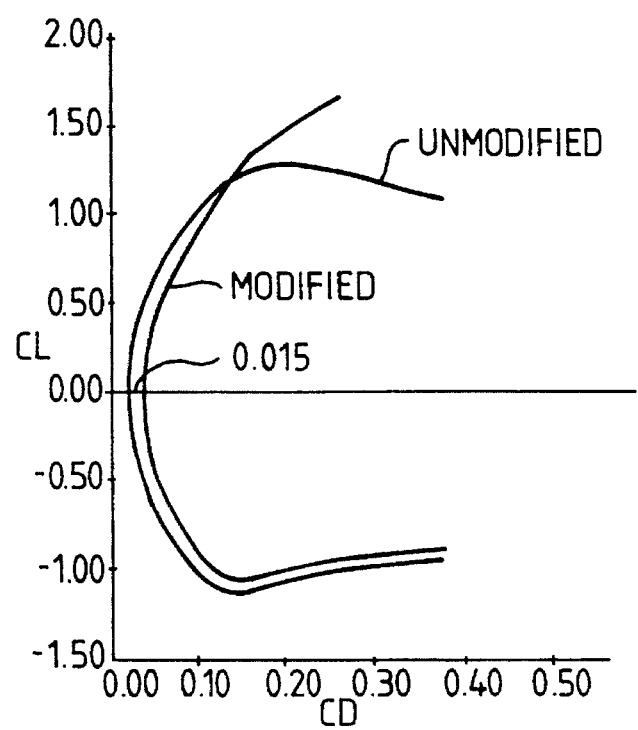
FIG. 5 is a graph illustrating the lift and drag characteristics of the aerofoils tested in FIG. 3.
Figure 6:
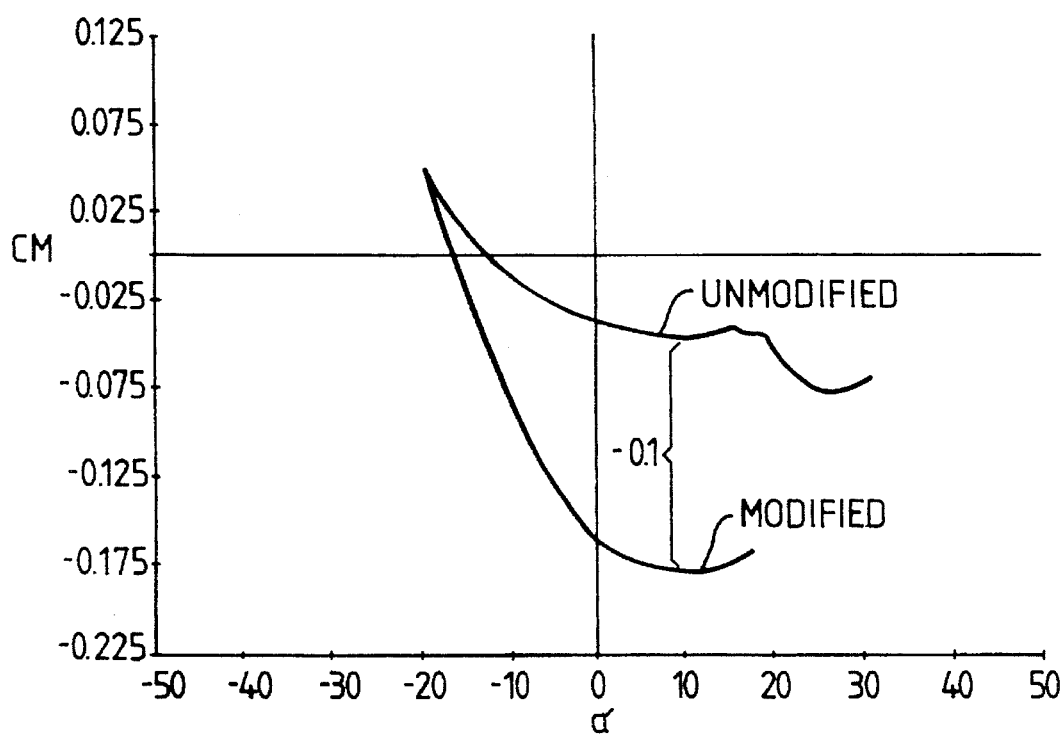
FIG. 6 is a graph illustrating the pitching moment characteristics of the aerofoils tested in FIG. 3.

FIG. 5 plots drag ($C_D$) against lift ($C_L$) and FIG. 6 plots pitching moment ($C_M$) against incidence ($\alpha$) for the modified aerofoil profile tested in FIG. 3 having a flow deflection device with a depth equal to 2.5% C., against a basic unmodified aerofoil profile. As shown in FIG. 5, the modified profile showed a fairly uniform drag penalty of about 0.015 at low lift and, from FIG. 6, a negative pitching moment penalty of about −0.1, both of which could be tolerated on fixed aerofoil structures but were totally unacceptable for rotary blades.

However, remembering that the tests by Liebeck (FIG. 2A) had showed an actual drag reduction for a flow deflection device with a depth of about 1.25% C., the inventors realised that detailed attention to depth might allow the rotary blade designer to select a drag penalty or advantage commensurate with the increase in lift that can be achieved by applying such a flow deflection device to the aerofoil profile of helicopter rotary blades.

Having established the potential of such a flow deflection device in respect of a range of incidence ($\alpha$), it was essential to determine whether or not the potential could be realised at low and mid Mach numbers and, importantly, without detrimental effects at high Mach numbers. This latter aspect was especially important since it was known that utilisation of conventional aft loading (e.g. flaps) or large amount of distributed aft camber, was precluded in helicopter rotary blade aerofoil profiles by performance penalties in respect of both pitching moment and drag.

Figure 7A:
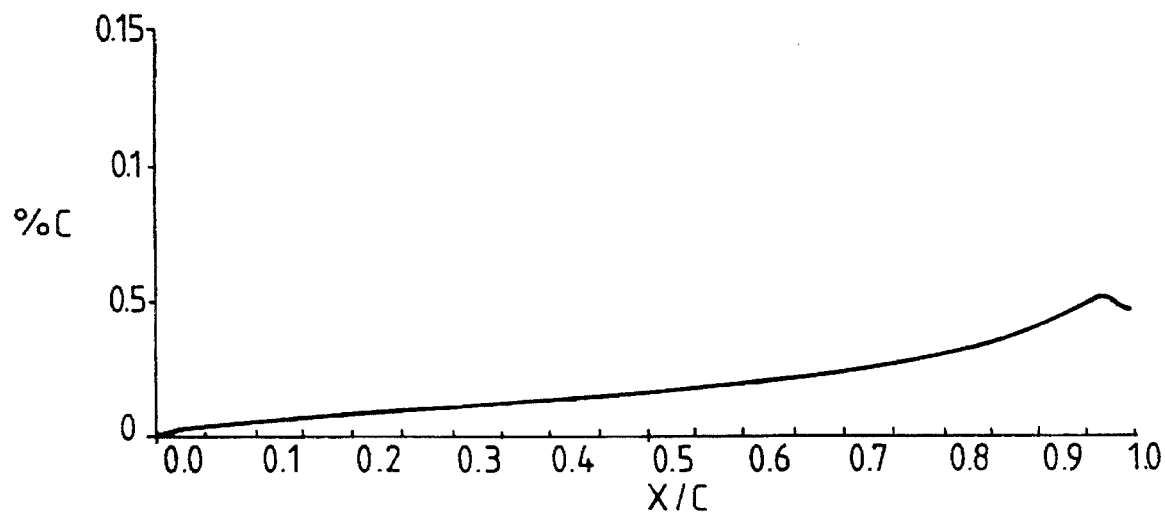
FIG. 7A is a graph illustrating calculations of the lower surface boundary layer thickness on an existing helicopter rotary blade aerofoil profile.

However, since it had been established that the flow deflection device of this invention can be specified to be of a similar size to the boundary layer, the inventors were confident that it could be used, possibly in combination with other developments in rotor configuration, to obtain a significant increase in rotor thrust capability. Calculations in respect of an existing unmodified helicopter rotary blade aerofoil profile (RAE 9645) operating at Mach 0.7 and negative incidence representative of an advancing blade are illustrated graphically in FIG. 7A which plots chord position X/C against boundary layer displacement thickness. The graph shows that boundary layer thickness increases towards the trailing edge to a thickness corresponding to about 0.5% C. This indicated to the inventors that a flow deflection device having a depth equal to about 0.5% C. should become buried in the thickened boundary layer in such operating conditions.

Because, as previously explained, the flow deflection device of this invention acts to attach flow at the trailing edge and increase loading at the rear of the aerofoil profile, it will tend to increase lift at a given incidence without changing markedly the flow conditions near the leading edge. Thus at low Mach number, an increase in lift results because of suppression of trailing edge separation and because the tendency to leading edge separation is not worsened.

The flow deflection device of this invention has, as previously mentioned, the effect of the superposition of an extra localised camber at the trailing edge. The resulting camber line velocity distribution does not alter flow conditions at the leading edge. The same effect is also true at mid Mach number where the limiting flow process involves shock induced separation near the upper surface nose. Therefore the maximum lift of the aerofoil profile should increase according to the Prandtl-Glauert factor up to the Mach number where the shock is moved sufficiently far aft to be affected by the flow deflection device.

Figure 8:
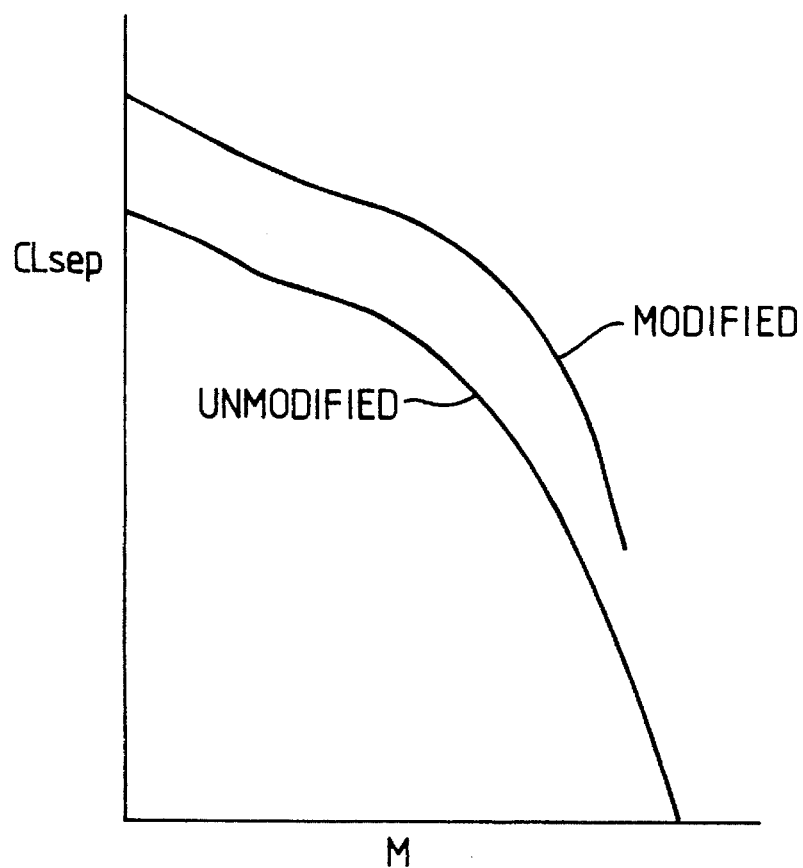
FIG. 8 is a graph illustrating the improved characteristics of an aerofoil profile modified according to this invention.

The overall effect is to increase the maximum lift coefficient across the entire Mach number range of importance (low to mid Mach number) as shown in FIG. 8 combined with no detrimental effects as Mach number (M) is increased.

If the above described improvements were attempted using conventional aft loading or camber, advancing blade performance (at high Mach number), where lift must go to zero, will deteriorate. To attain zero lift, negative additional loading must be used to overcome the positive ideal loading due to camber. The high velocity peak under the aerofoil leading edge gives rise to a strong shock, drag rise and shock induced separation. The greater the rear camber, the worse this problem becomes and attempts to alleviate the problem with local nose profile changes can result in loss of performance at high lift, especially at mid Mach number, since the means of alleviation is usually to reduce nose camber.

When operating a rotary blade incorporating a modern aerofoil profile at zero or negative lift at high Mach number (appropriate to an advancing blade) there will be a strong shock on the lower aerofoil surface near the nose. This shock is strong due to the conventional nose camber and the negative zero lift angle. On such a rotary blade incorporating the flow deflection device of this invention, the shock thickens the boundary layer on the lower surface and thus the thicker boundary layer tends to envelop the flow deflection device reducing its effect. The flow deflection device does not therefore increase the shock strength thus maintaining the drag at an acceptably low level. This mechanism is similar to that which, as previously explained, results in the effect of the flow deflection device disappearing at high negative lift when operating at low Mach number.

The inventors realised therefore that the adverse effect on a rotary blade fitted with the flow deflection device of this invention would be much smaller than might otherwise be expected in terms of both wave drag and unwanted pitching moments, especially if its size was kept small as would need to be the case in the helicopter rotary blade application.

Figure 9:
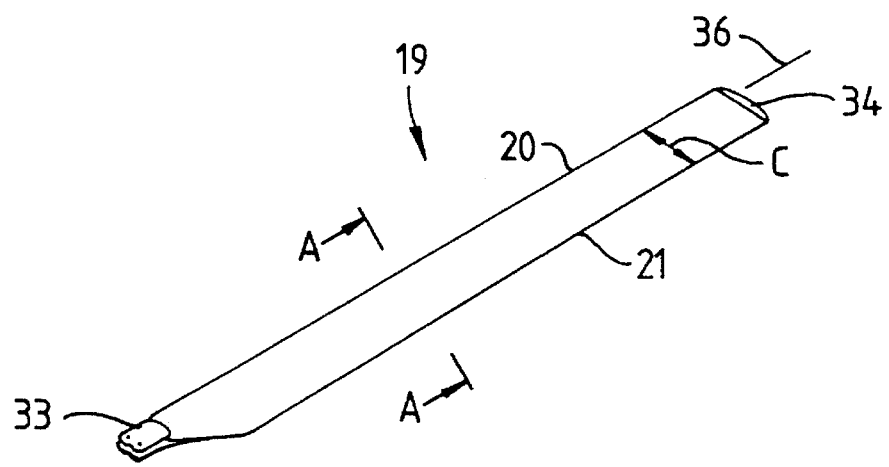
FIG. 9 is a perspective of a rotary blade constructed according to this invention and adapted for use on a helicopter main sustaining rotor.

FIG. 9 illustrates a helicopter rotary blade 19 having a leading edge 20 and a trailing edge 21 defining a blade chord C. The blade 19 includes a root end 33 adapted during operation for attachment to a rotor hub (not shown) and a tip end 34 defining a blade span, the root end attachment being adapted so as to permit changes of blade incidence about a pitch change axis 36 usually located at about 25 percent C.

Figure 10:
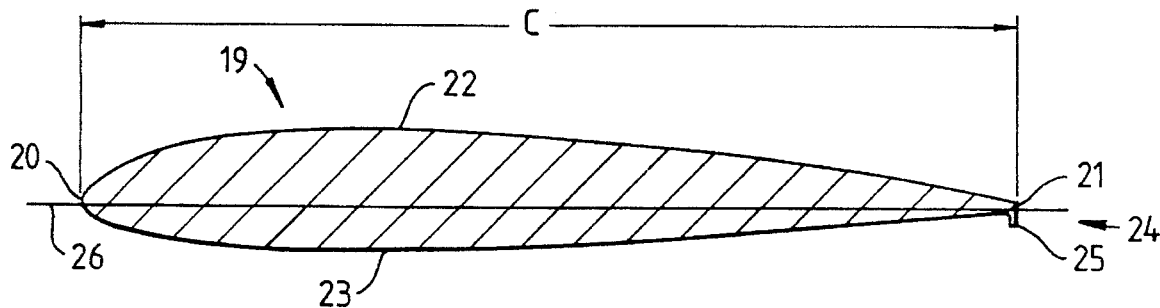
FIGS. 10A, 10B and 10C are sectioned views on arrows A—A of FIG. 9 and illustrate, respectively, various embodiments of a rotary blade according to this invention.
Figure 10:
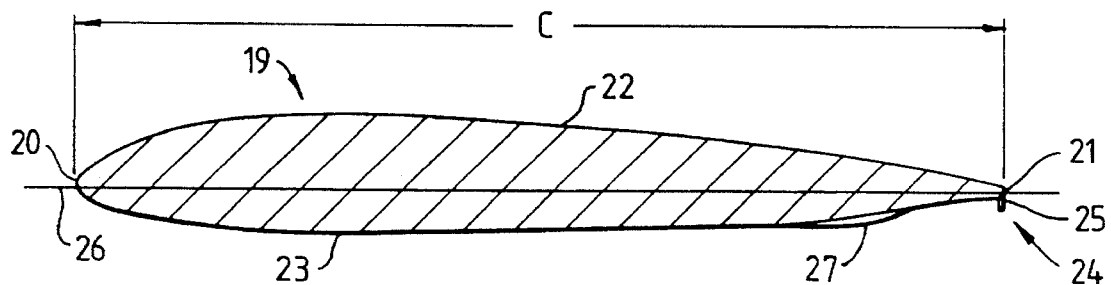
Figure 10:
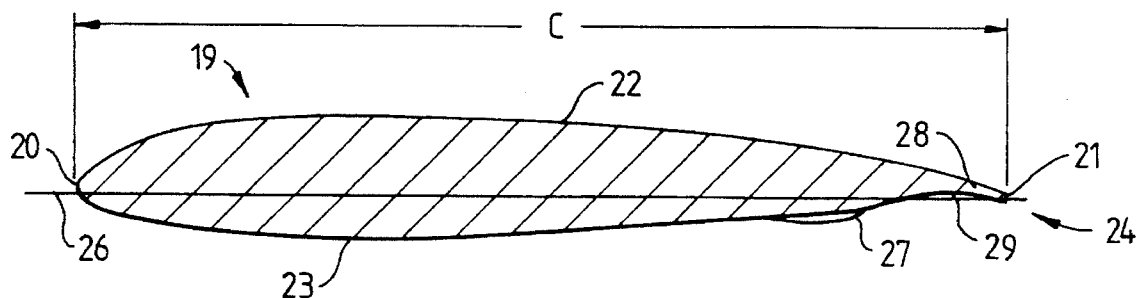

FIG. 10A is a cross section of the blade 19 constructed according to a simplest form of the present invention. The rotary blade 19 has its leading edge 20 and its trailing edge 21 joined by an upper surface 22 and a lower surface 23 defining an aerofoil profile having a chord C.

Rotary blade 19 includes a flow deflection device according to this invention generally indicated at 24 located along the trailing edge 21. The deflection device 24 in this embodiment comprises a thin strip 25 of any suitable metallic or composite material protruding from the lower surface 23 along the blade trailing edge 21 and generally perpendicular to a chord line 26.

The inventors also considered that careful design of the lower surface 23 of the aerofoil profile might allow the beneficial effects of the flow deflection device 25 to take place even prior to the onset of the strong lower surface shocks, and that the combination of a device to promote the natural thickening of the lower surface boundary layer and a flow deflection device such as illustrated at 25 in FIG. 10A offered the potential to make a further significant improvement in the performance of the rotary blade.

Bearing in mind that the design aim is to bury the flow deflection device 25 (whether in the form of a protruding strip or localised trailing edge camber) in the boundary layer under conditions where the otherwise increased aft loading would be an embarrassment, the inventors argued that it should be possible to tailor the lower surface 23 locally just upstream of the flow deflection device 25 to promote a thick boundary layer at the lower surface trailing edge which in turn will act to attenuate the adverse effect of the flow deflection device 25.

FIG. 10B illustrates a rotary blade 19 similar to that of FIG. 10A but modified as a result of that hypothesis to include a convex protrusion 27 located upstream of the flow deflection device 25 between about 80 and 90% C. on the lower surface 23 of the rotary blade 19. The purpose of the introduction of the region of locally increased curvature on the lower surface 23 by the convex protrusion 27 is to decelerate the boundary layer airflow to artificially encourage the rapid thickening of the boundary layer airflow towards the trailing edge 21 to further reduce any adverse effects of the flow deflection device 25 at low incidence.

FIG. 10C illustrates a yet further embodiment of this invention in which the flow deflection device 24 is formed by a large amount of localised camber 28 at the trailing edge 21 providing a concave surface 29 just ahead of the trailing edge 21 throughout the blade span. This embodiment retains the convex protrusion portion 27 on the lower surface 23 upstream of the localised camber portion 28.

In operation, the rotary blade 19 of this invention as disclosed in FIG. 10A, provides the potential, for the reasons hereinbefore explained, to increase the lift during high incidence low Mach number operation as encountered in a sustaining rotor retreating blade, whilst minimising any adverse effects during low or negative incidence high Mach number operation as encountered in a sustaining rotor advancing blade.

Figure 7B:
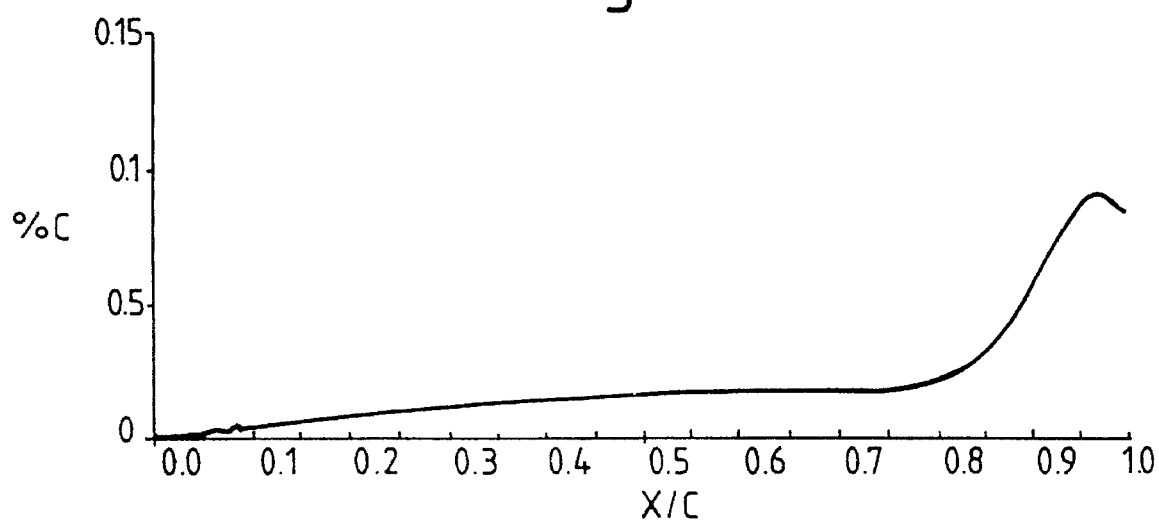
FIG. 7B is a graph similar to FIG. 7A illustrating the lower surface boundary layer thickness of a further embodiment of the invention.

With regard to the embodiments of FIGS. 10B and 10C incorporating the upstream convex protrusion 27, calculations by the inventors as illustrated graphically in FIG. 7B which plots chord position (X/C) against boundary layer displacement thickness (% C.) showed a rapid increase in boundary layer thickness near the trailing edge 21 of the lower surface 23 resulting from the sudden deceleration of the boundary layer airflow. They found that the displacement thickness rapidly approached 1% C. and the lower surface H-Parameter (ratio of boundary layer momentum thickness to displacement thickness) indicated incipient local trailing edge separation. Furthermore, a comparison of viscous and inviscid pressure distribution showed a favourable change in shock position and strength due to the deliberate thickening of the lower surface boundary layer which brings about an effective reduction in the angle for zero lift. The calculations illustrated in FIG. 7B were in respect of conditions similar to those of FIG. 7A, i.e., advancing blade conditions, and indicated to the inventors that the depth of the flow deflection device 25 or 28 in such an embodiment could be increased to about 1% C. without detriment to the advancing blade performance and with a further improvement in lift on the retreating blade.

The use of the flow deflection device 25 or 28 on such an aerofoil profile will have little adverse effect on shock location, wave drag or pitching moment since as previously explained it will become buried in the thick boundary layer in the high Mach number low or negative incidence condition.

However, the inventors discovered that an unexpected additional advantage resulted from the combination of the convex protrusion 27 and flow deflection device 25 or 28 in high Mach number low or negative incidence conditions. Thus, they found that the boundary layer tended to separate at about 90% C. on the lower surface 23 and that the flow deflection device 25 or 28 provided a locating point for re-attachment of the resulting separated shear layer. A localised separation bubble or very low energy boundary layer forms ahead of the flow deflection device 25 or 28 on the lower surface 23 and the inventors found that, as far as the outer inviscid flow was concerned, the aerofoil 19 had lost the effect of the camber due to the treatment of the lower surface in the region of 90% C. as well as the camber component due to the flow deflection device 25 or 28 itself. The aerofoil therefore functioned similarly to a much thinner aerofoil of much lower camber which further reduces wave drag and the adverse effects of aft loading.

In contrast, at lower Mach number and positive incidence the convex protrusion 27 on the lower surface 23 was found to have little effect on the boundary layer thickness and therefore did not detract from the lift enhancing properties associated with the use of the flow deflection device 25 or 28 alone. The effective trailing edge angle will be increased by the influence of the flow deflection device 25 or 28 and the upper surface boundary layer will remain attached.

As previously discussed, the design of aerofoil profiles for rotary blades for helicopters divide naturally according to the intended use on either anti-torque tail rotors or main sustaining rotors. In the latter case, the extremes of Mach number feature strongly in the design whereas, for the tail rotor, tip relief and the fact that these extremes of Mach number occur at "off design" conditions allows the aerofoil performance to be optimised for mid Mach numbers to suit the hovering and manoeuvring flight regimes.

The inventors were convinced therefore that rotary blades constructed according to this invention could indeed provide additional thrust both from a main sustaining and an anti-torque tail rotor of a helicopter thereby achieving the main objective by extending the operating envelope of a helicopter on which they are fitted.

Since rotary blades for helicopter tail rotors often operate at high thrust levels near their aerofoil stall boundary and are generally pitch limited, the full beneficial effect of the flow deflection device of this invention is obtained and the change in the zero lift angle is useful in limiting the additional pitch range needed to produce extra thrust from an existing tail rotor. In order to maximise the effectiveness of the flow deflection device, yet limit its effect on pitching moments, the characteristics e.g. the height or shape, can be varied along the length of the blade, thereby also increasing the aerodynamic twist of the rotary blade. It will be understood that if tail rotor thrust is increased, rather than the advantage being taken of the improved performance as a decrease in pitch required for a given manoeuvre, additional power will be consumed; however, the increase in induced (thrust dependent) power can be offset to some extent by increasing the margin away from aerofoil drag divergence and stall.

Figure 11:
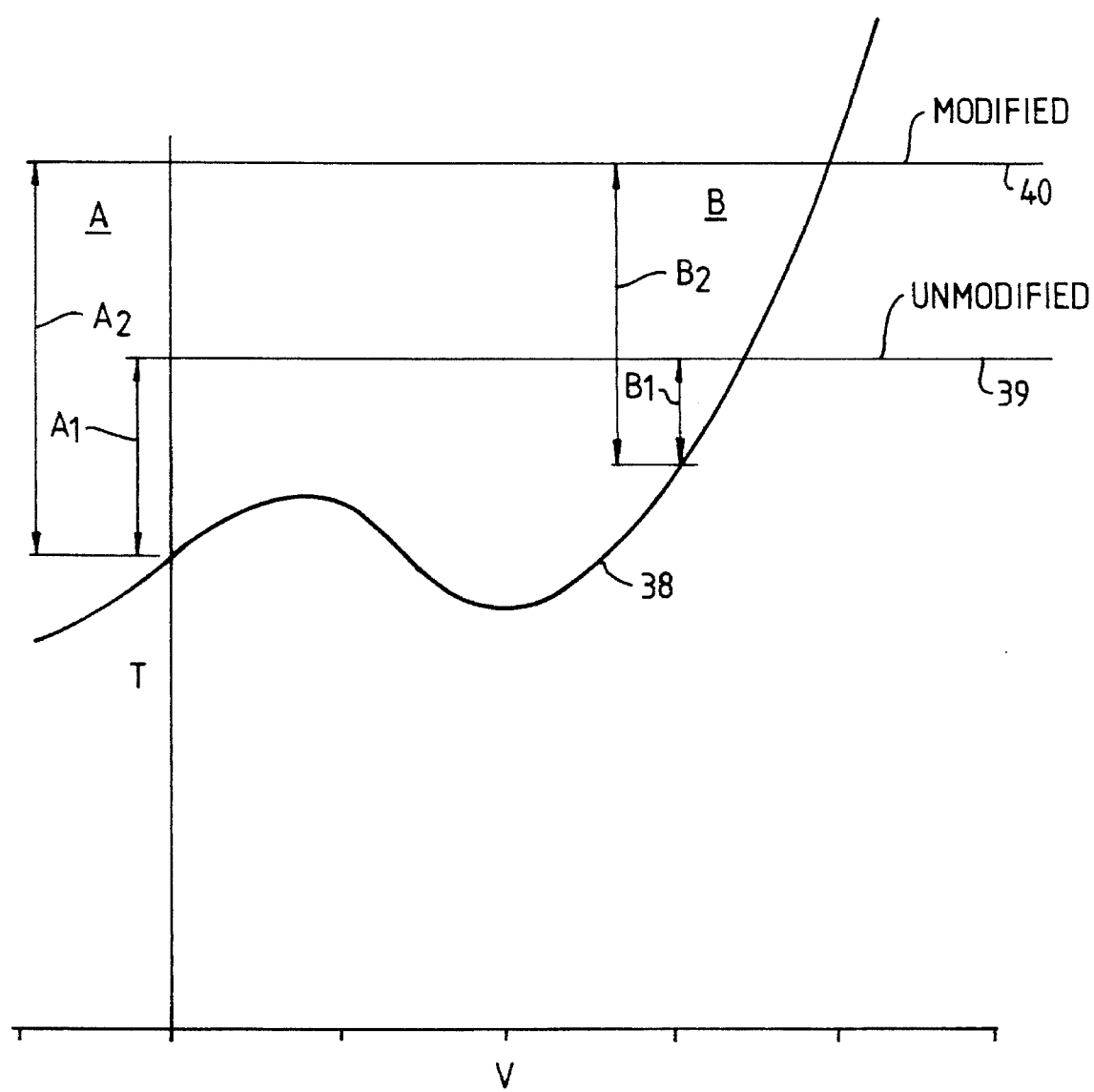
FIG. 11 is a graph illustrating the potential benefits of applying rotary blades according to this invention to a helicopter anti-torque rotor.

FIG. 11 shows how any percentage improvement in tail rotor thrust is effectively doubled when the manoeuvre margin is considered. The Figure plots tail rotor thrust T against sideways flight velocity V and shows at 38 a normal thrust requirement. Also shown at 39 is the maximum thrust from a tail rotor with unmodified rotary blades and at 40 the maximum thrust from a tail rotor with rotary blades according to this invention. Two flight states are considered, namely a hover state indicated at A and a sideways flight state indicated at B. The respective manoeuvre margins for a tail rotor with unmodified rotary blades are indicated at $A_1$ and $B_1$, and the corresponding manoeuvre margins for a tail rotor with rotary blades according to this invention are indicated at $A_2$ and $B_2$. The inventors consider that the incorporation of this invention could generate an additional 10 to 15% of tail rotor thrust on a given tail rotor and therefore improve the manoeuvre margin by up to 30%.

The inventors also believe that the invention can successfully be applied to the main sustaining rotary blades for most types of helicopter. Again, the trailing edge flow deflection device characteristics can be varied along the length of the rotary blade to provide additional aerodynamic twist to improve hover efficiency and to complement advanced planform and pitching moment considerations.

As previously explained the height of the flow deflection device is carefully selected in order to avoid drag rise and pitching moments on the advancing blade whilst being sufficiently effective to produce the required thrust benefit in the retreating and aft sectors of the rotor operational disc. These combined requirements are the reason that the height of the flow deflection device of this invention on rotary blades is significantly less than that used previously on fixed aerofoil profiles certainly in the outer region of the blades towards the tip, e.g. between about 70 percent and 100 percent of the rotary blade span dimension, which experience the highest Mach number during operation. As a general rule the height of the deflection device in the outer region of the rotary blade will be of the same order as the thickness of the boundary layer on the lower surface of the advancing blade which tests and calculations have shown to be between 0.5 and 1.0% C.; although in the aforementioned embodiments in which the height varies throughout the blade span, the height in the inner region may exceed 1.0% C. The embodiment combining the trailing edge flow deflection device with the upstream boundary layer thickening device is particularly useful in selecting an appropriate configuration for this invention. The aerofoil profiles and blade planform features of modern helicopter rotary blades are well suited to the varying conditions of the advancing and retreating blades at their initial design loading; however, it is anticipated that the flow deflection device of this invention could yield up to a 10% rotor thrust increase for minimal power or pitching moment penalty.

Whilst the invention has herein been described with particular reference to use on rotary blades for helicopter main sustaining and anti-torque rotors, rotary blades according to the invention can be used to advantage in many other applications. Thus, the rotary blades can be used in an assembly of a plurality of such blades connected for rotation by a power source, for example a gas turbine engine, to generate propulsive and/or lift forces both as conventional propeller blades for rotation about a horizontal axis and for prop/rotors arranged to be tilted between a position in which they are rotated about a substantially horizontal axis to produce propulsive forces and a position in which they are rotated about a substantially vertical axis to produce lift forces for a tilt rotor or tilt wing aircraft.

The flow deflection device of this invention can of course be incorporated in the design of a new family of either metal or composite rotary blades and may also be incorporated in existing particularly metal rotary blades such as by suitable bending of a trailing edge tab to provide both the flow deflection device 25 and the upstream flow thickening device 27.

Figure 12:
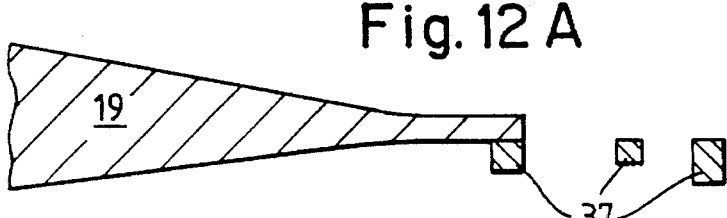
FIGS. 12A–12J illustrates various means of incorporating the invention on existing rotary blades.
Figure 12:
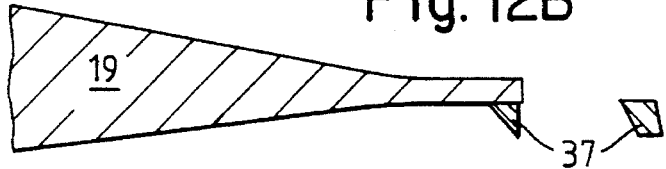
Figure 12:
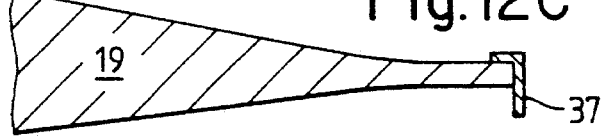
Figure 12:
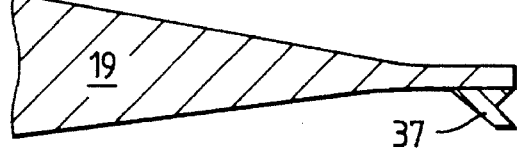
Figure 12:
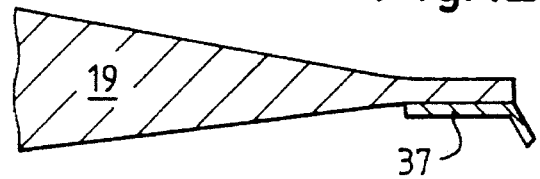
Figure 12:
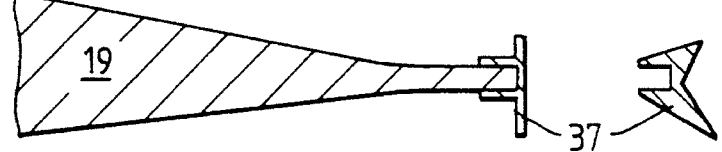
Figure 12:
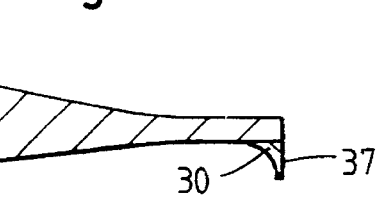
Figure 12:
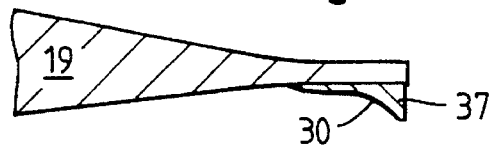
Figure 12:
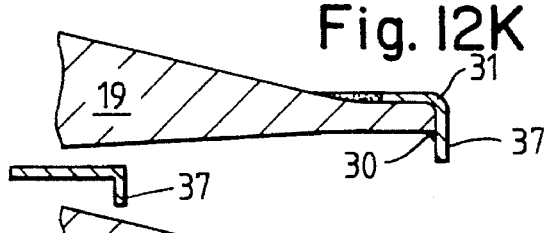
Figure 12:
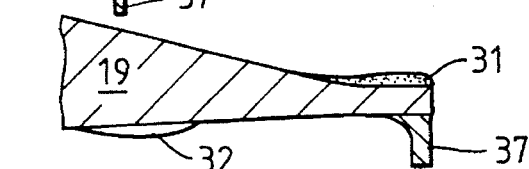

The invention can also be applied as a retro-fit item to existing rotary blades by the use of specially shaped strips for both the trailing edge flow deflection device and the upstream flow thickening device for attachment to the surface of the blade by any appropriate adhesive or mechanical means. FIG. 12 illustrates some possible configurations of add-on strips all identified by numeral 37 for fixing to existing rotary blades. It is believed that the features of these devices will be self evident; however, some of the modifications are particularly significant. Thus, the use of a curved fillet upstream of the device 37 as indicated at 30 in configurations G, H and K in FIG. 12 to blend with the blade lower surface could be used to minimise the effect of a separation bubble that forms upstream of the flow deflection device 37 on the lower surface, thereby to improve the effectiveness of the device in that condition and thus enabling the height of the device to be minimised. The curved fillet 30 can either be part of the add-on strip 37 (G and H) to provide additional attachment area or can be formed using filler to blend with the surface of a folded device 37 attached to the upper trailing edge surface (configuration K). This leads to another modification comprising the addition of a third profile modification on the upper surface trailing edge which could be useful in providing a radiused upper surface trailing edge corner as at 31 in configurations K and J of FIG. 12. Such a modification may be beneficial by deflecting the boundary layer flow upwards at the trailing edge when the blade is at low incidence in addition to further improving the efficiency of the flow deflection device 37. Such a feature can be incorporated by blending a simple folded strip attached to the upper surface trailing edge (configuration K) or by the addition of a separate strip or contour modification (configuration J). The auxiliary upstream boundary layer thickening device can also be provided by an add-on strip for retro-fit purposes as indicated at 32 in configuration J of FIG. 12.

Whilst several embodiments of the invention have been described and illustrated it will be apparent that many modifications may be made without departing from the scope of the invention as defined in the appended claims.

What is claimed is:

1. A helicopter rotary blade having a root end for attachment to a rotor hub and a tip end defining a blade span and in cross section being of aerofoil profile having a leading edge and a trailing edge defining a blade chord and joined by an upper surface and a lower surface, the blade in use being adapted for movement through a range of incidence angles with respect to an airflow, wherein the rotary blade includes a fixed boundary layer flow deflection device extending spanwise at or adjacent the lower surface trailing edge and adapted, when the blade is operating at high positive incidence angles to protrude through a boundary layer flow on the lower surface so as to deflect the boundary layer on the lower surface away from the trailing edge thereby improving the lift characteristics of the rotary blade and when the blade is operating at low or negative incidence angles to be immersed in a thicker boundary layer flow on the lower surface so as to have substantially no effect on the boundary layer flow.

2. A blade as claimed in claim 1, wherein the flow deflection device extends over substantially all of the blade span.

3. A blade as claimed in claim 1, wherein said flow deflection device is formed integral with the lower aerofoil surface.

4. A blade as claimed in claim 1, wherein said flow deflection device is attached to the lower aerofoil surface.

5. A blade as claimed in claim 1, wherein said flow deflection device comprises a fixed strip protruding from the lower surface at the trailing edge and generally perpendicular to a chord line.

6. A blade as claimed in claim 1, wherein said flow deflection device is provided by local cambering of the aerofoil at the lower surface in the region of the trailing edge of the blade.

7. A blade as claimed in claim 1, wherein the size of the flow deflection device is of the order of 1 percent chord in height towards the blade tip.

8. A blade as claimed in claim 1, wherein the size of the flow deflection device is between about 0.5 and 1 percent chord in height towards the blade tip.

9. A blade as claimed in claim 8, wherein said height of between about 0.5 and 1.0 percent chord extends between about 70 percent and 100 percent of the blade span dimension.

10. A blade as claimed in claim 1, wherein the size of the flow deflection device varies along the length of the span dimension.

11. A blade as claimed in claim 1, wherein a boundary layer flow thickening device is provided on the lower surface upstream of the flow deflection device.

12. A blade as claimed in claim 11, wherein said flow thickening device comprises a local protrusion formed on the lower surface.

13. A blade as claimed in claim 12, wherein said protrusion is a convex protrusion.

14. A blade as claimed in claim 11, wherein said flow thickening device is located between approximately 80 percent chord and 90 percent chord.

15. A blade as claimed in claim 1, wherein a curved fillet blends the flow deflection device with the blade lower surface.

* * * * *